United States Patent
Reitzner et al.

(10) Patent No.: US 7,553,422 B2
(45) Date of Patent: Jun. 30, 2009

(54) METHOD AND DEVICE FOR PURIFYING WATER OF NUCLEAR INSTALLATIONS

(75) Inventors: Uve Reitzner, Erlangen (DE); Volker Schneider, Möhrendorf (DE); Waldemar Tischler, Erlangen (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/855,546

(22) Filed: Sep. 14, 2007

(65) Prior Publication Data

US 2008/0128360 A1    Jun. 5, 2008

Related U.S. Application Data

(63) Continuation of application No. PCT/EP2006/007674, filed on Aug. 3, 2006.

(30) Foreign Application Priority Data

Aug. 12, 2005 (DE) ........................ 10 2005 038 415

(51) Int. Cl.
  *B01D 24/26* (2006.01)
(52) U.S. Cl. ........................ 210/681; 210/688; 210/759; 210/762; 210/763; 210/264
(58) Field of Classification Search ......... 210/681–688, 210/763, 759, 762, 264
See application file for complete search history.

(56) References Cited

U.S. PATENT DOCUMENTS

| 4,900,520 | A | * | 2/1990 | Behnam et al. | ................ | 75/426 |
| 4,985,540 | A | * | 1/1991 | Bradford et al. | ............ | 528/482 |
| 5,632,885 | A | | 5/1997 | Yamasaki et al. | | |
| 5,643,457 | A | * | 7/1997 | Abramov et al. | ............ | 210/668 |
| H1948 | H | | 3/2001 | Rusek et al. | | |
| 6,335,475 | B1 | | 1/2002 | Nagase et al. | | |
| 7,077,964 | B2 | * | 7/2006 | Klipper et al. | .............. | 210/688 |
| 2003/0012708 | A1 | * | 1/2003 | Sakamoto et al. | ........... | 422/180 |
| 2003/0132104 | A1 | | 7/2003 | Yamashita et al. | | |

FOREIGN PATENT DOCUMENTS

| DE | 196 26 697 A1 | 1/1998 |
| EP | 0 816 294 A2 | 1/1998 |
| FR | 2 746 207 | 9/1997 |
| GB | 783590 | 9/1957 |
| JP | 09257992 A | 10/1997 |
| WO | WO 2004096717 A2 * | 11/2004 |

* cited by examiner

*Primary Examiner*—Chester T Barry
(74) *Attorney, Agent, or Firm*—Laurence A. Greenberg; Werner H. Stemer; Ralph E. Locher

(57) ABSTRACT

A method of purifying water in a nuclear installation includes an ion exchange mechanism in which the water is purified with an ion exchanger. Before being guided over the ion exchanger, the water is brought into contact with a catalyst in order to decompose hydrogen peroxide that is present in the water.

10 Claims, 2 Drawing Sheets

US 7,553,422 B2

METHOD AND DEVICE FOR PURIFYING WATER OF NUCLEAR INSTALLATIONS

CROSS-REFERENCE TO RELATED APPLICATIONS

This is a continuing application, under 35 U.S.C. § 120, of copending international application No. PCT/EP2006/007674, filed Aug. 3, 2006, which designated the United States; this application also claims the priority, under 35 U.S.C. § 119, of German patent application No. DE 10 2005 038 415.3, filed Aug. 12, 2005; the prior applications are herewith incorporated by reference in their entirety.

BACKGROUND OF THE INVENTION

Field of the Invention

The invention relates to a method for purifying water of nuclear installations. In specific areas of nuclear installations, for example cooling ponds for spent fuel elements, a water reservoir in the radiation area of the reactor, and in the primary coolant circuit, to the extent that no possibility is provided for the imparting of a hydrogen excess, hydrogen peroxide is produced by radiation-induced radiolysis of water molecules, inter alia. If water is guided from one of those areas for purification via an ion exchanger, the ion exchanger material contained therein, this generally being ion exchanger resin, is oxidized, and its effectiveness and service life are thereby impaired. Exchanger material that is no longer active must be disposed of, and this is complicated and expensive because it is a radiating material. Added to this is a further problem consisting of the transfer of decomposition products, resulting from the oxidation, of the ion exchanger resin into the water flowing through, which is contaminated thereby. Various efforts have already been made in the past to provide a remedy here. Problems are caused chiefly by the high throughput on account of the large quantities of water to be purified. The ion exchangers generally encounter a water throughput of 5 to 20 kg/s. Simply for this reason, destroying the hydrogen peroxide by radiation with UV light gives rise to difficulties to the extent that the radiation density required, given the prevailing flow rates, would be achievable only with considerable technical outlay. A further possibility would consist in introducing hydrogen, but this is likewise associated with a high outlay and takes place too slowly and incompletely without catalytic support in said examples of application.

SUMMARY OF THE INVENTION

It is accordingly an object of the invention to provide a method and a device for purifying water of nuclear installations which overcomes the above-mentioned disadvantages of the heretofore-known devices and methods of this general type and which render possible in a technically simple way a reliable protection of the ion exchangers used for the purification.

With the foregoing and other objects in view there is provided, in accordance with the invention, a method for purifying water of a nuclear installation, the method which comprises:

purifying the water by an ion exchange mechanism in an ion exchanger; and before subjecting the water to the ion exchanger, decomposing hydrogen peroxide contained in the water by guiding the water over structures upstream of the ion exchanger, wherein the structures are formed by sheet-metal blanks aligned substantially in a direction of flow and coated with, or consisting of, a catalytically active material.

In other words, a method is proposed in which, before being guided over the ion exchanger, water to be purified is catalytically freed from hydrogen peroxide contained therein. Catalytic conversion of hydrogen peroxide can be carried out with a very low technical outlay, requires use of few personnel and little outlay on maintenance, and supplies water and oxygen as end products. A catalytically acting device that preferably comprises structures that are catalytically coated or consist of catalytically active material is effective in the long term without the need for regular regeneration or other maintenance measures. Moreover, it has a high surface efficiency and therefore small dimensions. It is also chiefly suitable for retrofitting existing ion exchanger installations. There is neither a need to add auxiliary substances to the water that is to be treated, nor does a catalyst device output substances to the water to be treated. It is, furthermore, advantageous that there is no need in any way to effect changes to the material surface of the relevant system itself. The catalytic device operates without a supply of energy and largely independently of repair. It is preferred to use as structures thin metal sheets that are aligned substantially in the direction of flow. Such a configuration prevents instances of turbulence that lead to an increased pressure loss from arising in the water that is to be purified.

In accordance with a preferred device for carrying out the proposed method, a number of series-connected catalyst modules are arranged in the feed line connected to the ion exchanger. By and large, a feed line has a sufficient length in order, depending on application, to be able to accommodate an adequate number of catalyst modules. The catalyst modules can be inserted and fixed in a simple way. It is advantageous in this case that there is no need for a separate treatment station, for example a container filled with a catalyst structure or a catalytically active bed. It is particularly advantageous that already existing ion exchanger installations can be retrofitted in a simple way. A catalyst module is preferably composed of a sleeve with a catalyst structure arranged therein. The catalyst structure is formed in this case from a multiplicity of catalyst metal sheets extending in the direction of flow. This provides a large surface for the catalytic conversion of the hydrogen peroxide. By way of example, a corrugated or inherently curved shape, or a combination of the two, can be selected for the catalyst construction with reference to an enlarged or maximal active surface and, alternatively, in addition to the enhancement of the mechanical stability. This can be achieved, for example, by virtue of the fact that a corrugated metal sheet is arranged in an interspace bounded by two metal sheets.

Other features which are considered as characteristic for the invention are set forth in the appended claims.

Although the invention is illustrated and described herein as embodied in a method for purifying water of nuclear installations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
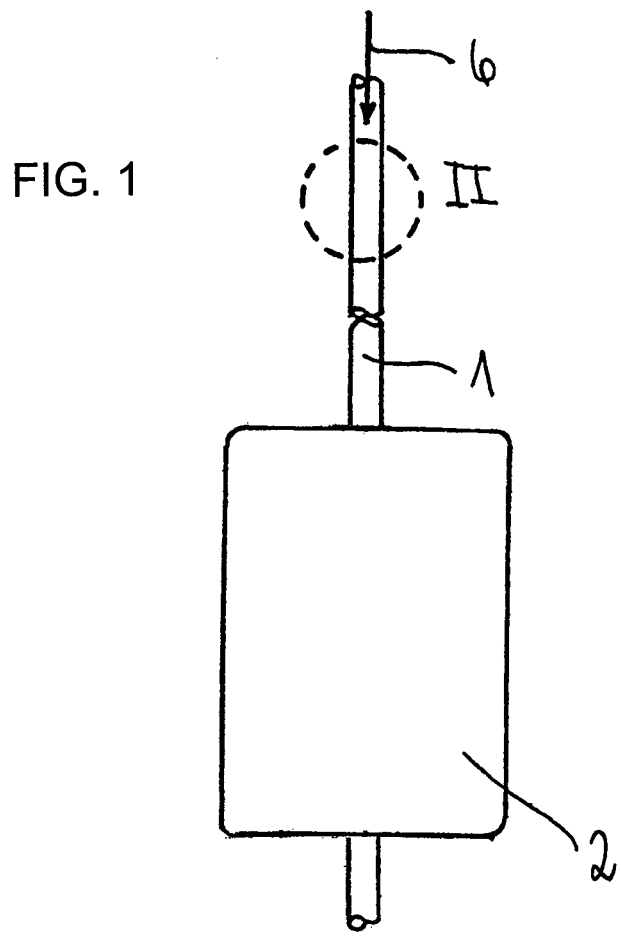
FIG. 1 shows a schematic of an ion exchanger, with a feed line connected thereto, with catalyst modules located therein.
Figure 2:
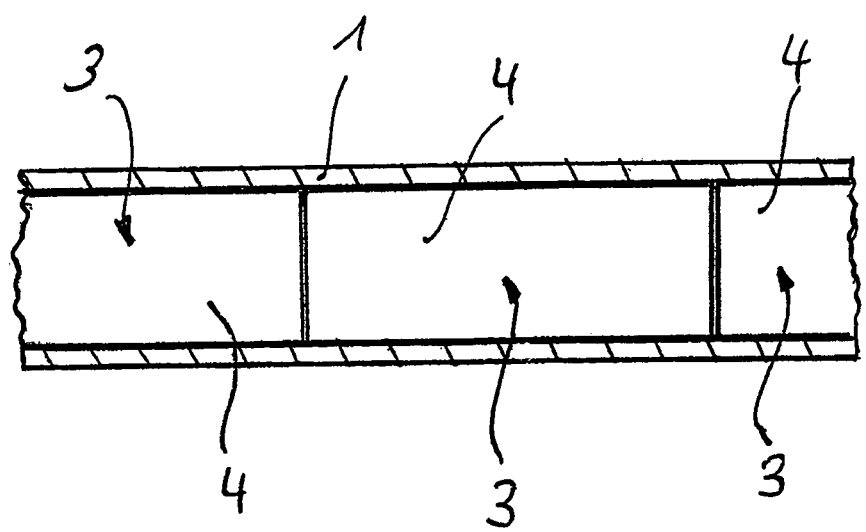
FIG. 2 is an enlarged view of detail II from FIG. 1.

Referring now to the figures of the drawing in detail, in order to carry out the purification of, for example, water located in a coolant pond of a nuclear power plant, the water is fed to an ion exchange filter 2 via a feed line 1. A bed consisting of spherical ion exchanger resins can be present in the ion exchange filter 2. Separate cation and anion exchange filters may be connected in series. The presence of mixed bed filters with cation and anion exchanger resin in stratified form or intimately mixed is also possible, as are combinations of individual and mixed bed filters. There can also be ion exchange filters with an alluviation of pulverulent ion exchanger resins (mixture of cation and anion exchanger material).

In order to remove hydrogen peroxide contained in the water in a simple way that is also easy to retrofit with regard to already existing installations, a selective number of catalyst modules 3 are arranged in a section of the feed line 1 that is located upstream of the ion exchanger 2. A catalyst module is essentially a sleeve 4 consisting of VA steel (high-grade steel), in particular, and a catalyst structure 5 arranged therein. The outside diameter of the sleeve 4 is slightly smaller than the inside diameter of the feed line 1, and so the sleeves can be arranged in the feed line 1 with a simple holder without being welded on. It is thus possible for a catalyst module 3 to be retrofitted in the feed line of already existing purification plants. To this end, either the catalyst modules 3 are introduced into the existing feed line, if appropriate with the aid of additional flange pairs, or a region of the feed line is replaced by a section that contains catalyst modules 3.

Figure 3:
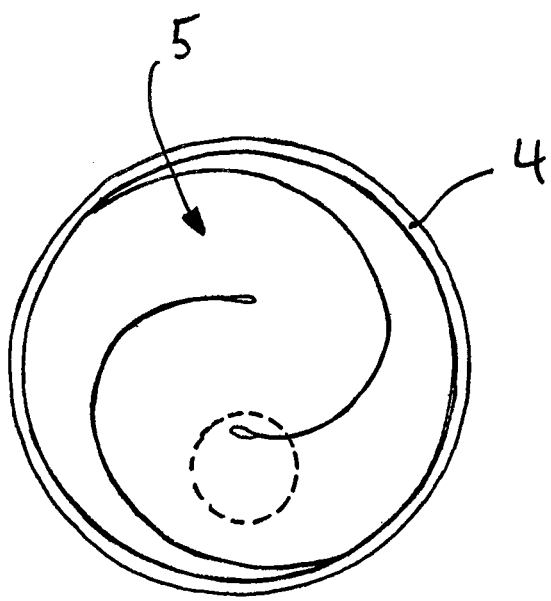
FIG. 3 is a plan view of the end face of a catalyst module.
Figure 4:
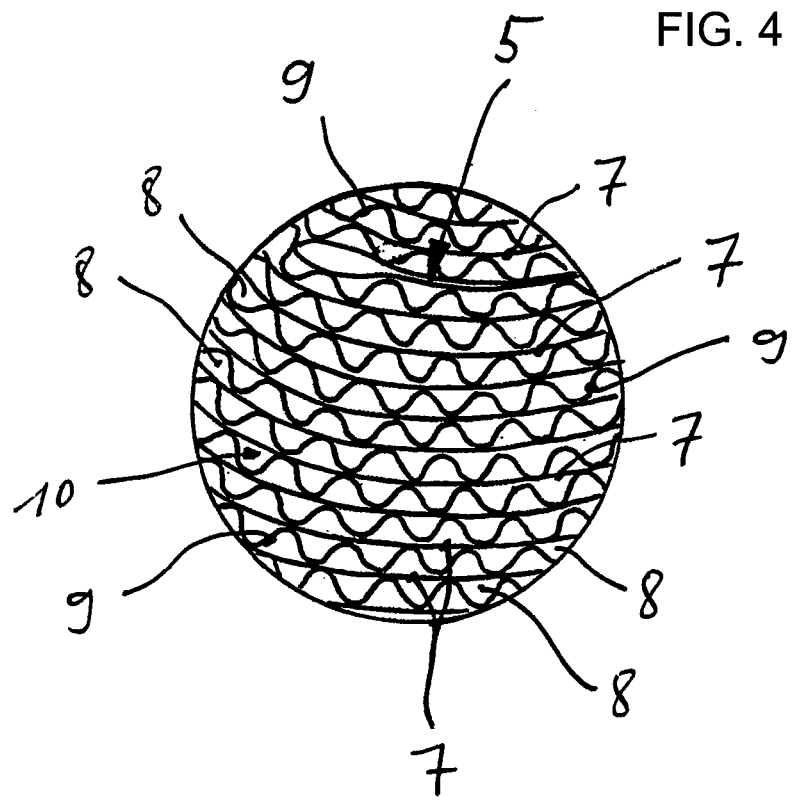
FIG. 4 is an enlarged view of detail IV from FIG. 3.

With reference to FIGS. 3 and 4, the catalyst structure 5 has, for example, a multiplicity of sheet-metal blanks 7 extending in the longitudinal direction of the feed line 1 or in the direction of flow 6. The sheet-metal blanks 7 enclose, for example, an interspace 8 in which a corrugated metal sheet 9 is respectively arranged. In this way, the inside cross section of the sleeve 4 is subdivided into a large number of flow channels 10. The corrugated sheet-metal blanks 9 also extend in the direction of flow 6, and so the catalyst structure 5 opposes the water flowing through the feed line 1 with a low resistance. This is based, inter alia, on the fact that the catalyst structure 5 fashioned in the way described does not disturb the laminar flow of the water in the feed line 1, and instances of turbulence which increase resistance are thereby avoided. On the basis of the very high number of flow channels 10, a correspondingly large surface area is created for the catalytic conversion of the hydrogen peroxide. The sheet-metal blanks 7 and the corrugated sheet-metal blanks 9 are coated with platinum as catalytic material. The catalytically active surface can further be enlarged by virtue of the fact that microporous platinum material is applied to the sheet-metal blanks 7 and corrugated sheet-metal blanks 9. For example, given a throughput of approximately 7 kg/s for the feed line 1 containing the catalyst modules 3, and a tube diameter of approximately 300 mm for the feed line 1, the feed line 1 is fitted with catalyst modules 3 on a length of approximately 2.5 m in order to ensure a decomposition of the hydrogen peroxide contained therein at a concentration of approximately 15 mg/l.

The invention claimed is:

1. A method for purifying water of a nuclear installation, the method which comprises:

purifying the water by an ion exchange mechanism in an ion exchanger; and before subjecting the water to the ion exchanger, decomposing hydrogen peroxide contained in the water by guiding the water over structures upstream of the ion exchanger, wherein the structures are formed by sheet-metal blanks aligned substantially in a direction of flow and coated with, or consisting of, a catalytically active material.

2. The method according to claim 1, which comprises using an element or a mixture of elements from the platinum group as the catalytically active material.

3. The method according to claim 2, wherein the catalytically active material is platinum.

4. A device for purifying water of a nuclear installation, the device comprising:

an ion exchanger for purifying the water by an ion exchange mechanism in the ion exchanger; and a feed line connected to said ion exchanger;

a plurality of series-connected catalyst modules disposed in said feed line upstream of the ion exchanger, each catalyst module being formed by sheet-metal blanks aligned substantially in a direction of flow and coated with, or consisting of, a catalytically active material; and wherein, before subjecting the water to the ion exchanger, hydrogen peroxide contained in the water is decomposed by guiding the water over said plurality of series-connected catalyst modules in said feed line.

5. The device according to claim 4, wherein a respective said catalyst module is formed with a sleeve and a multiplicity of sheet-metal blanks fixed in said sleeve, said sheet-metal blanks extending in a direction of flow of the water through the sleeve and respectively enclosing interspaces therebetween.

6. The device according to claim 5, wherein corrugated sheet-metal blanks are respectively disposed in said interspaces bounded by said sheet-metal blanks.

7. The device according to claim 6, wherein said sheet-metal blanks and said corrugated sheet metal blanks are coated with a metal or a metal mixture of the platinum group.

8. The device according to claim 7, wherein said sheet-metal blanks and said corrugated sheet-metal blanks are coated with platinum.

9. The device according to claim 5, wherein said sheet-metal blanks are coated with a metal or metal mixture of the platinum group.

10. The device according to claim 9, wherein said sheet-metal blanks are coated with platinum.

* * * * *